Patented Dec. 29, 1953

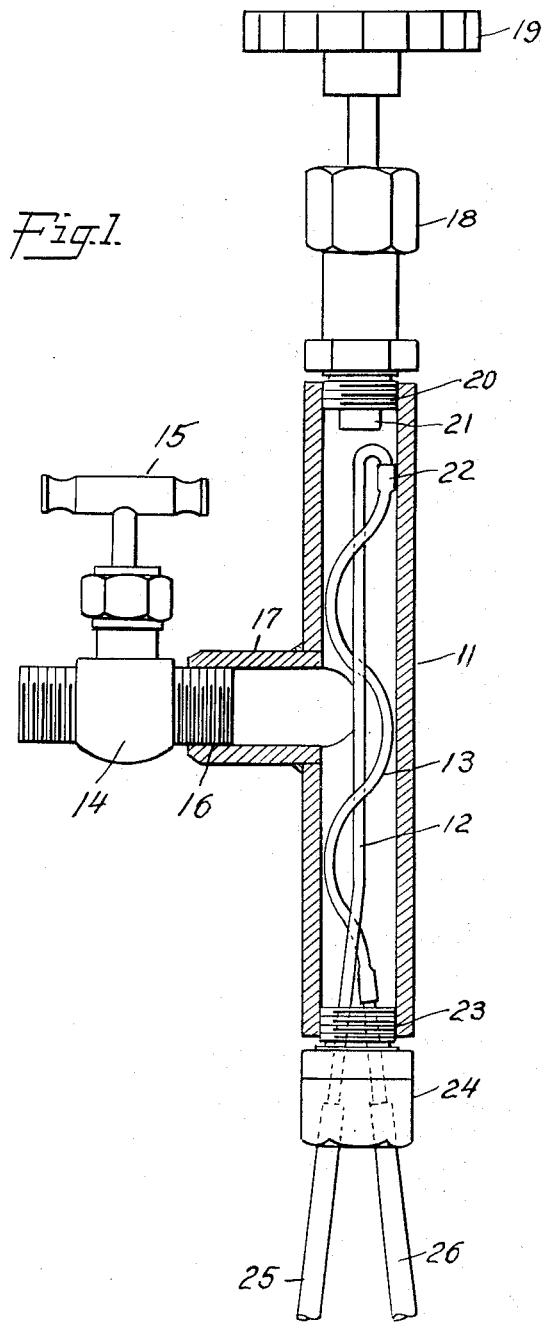

2,664,111

UNITED STATES PATENT OFFICE 2,664,111

FLUID FLOW CONTROL

John J. Piros, Homewood, Ill., assignor, by mesne assignments, to Sinclair Research Laboratories Inc., Harvey, Ill., a corporation of Delaware Application January 19, 1949, Serial No. 71,588

1 Claim. (Cl. 138—46)

This invention relates to a novel means for controlling the flow of fluids at very low rates, and more particularly, to a method and apparatus for precisely regulating flow rates of fluids under micro conditions.

Very low fluid flow rates are conventionally controlled by so-called "needle" valves. In this type of valve the entire pressure drop required for control of the micro flow rate is generally taken across the seat of the valve. Since the seat is very short in length, the annulus formed between the needle and seat is extremely small, making the valve readily susceptible to plugging at low rates of flow. In addition, leakage through the valve stem packing and contamination of the fluid by the lubricant in this packing have proved to be objectionable. And the valve stem of such a conventional needle valve is very sensitive to the slightest external movement which, accordingly, effects a considerable, but undesirable, change in the flow rate.

I have found that these objections can be overcome by passing the fluid the flow rate of which is to be controlled through a long compressible conduit of small cross-sectional area and subjecting the conduit to the controlled compressive pressure of a non-compressible liquid. In this manner the pressure drop is taken across a relatively long length and the cross-sectional area available for fluid flow is considerably larger than in conventional control methods and valves. As a result, plugging is largely overcome, contamination of the fluid is eliminated, and accurate control of the micro flow rate is made possible.

An advantageous embodiment of my invention comprises passing the fluid through an elongated rubber tube of small internal diameter and subjecting the tube to the pressure of a non-compressible liquid, for instance, mercury, the pressure of the mercury on the tube being capable of accurate regulation. The non-compressible mercury squeezes the rubber tube which reduces the internal diameter of the conduit and effects the control on the amount of fluid passing through the tube. In particular, my invention includes a valve for precisely regulating flow rates of fluids under so-called micro conditions. The valve comprises a rubber tube passing through and enclosed in a narrow elongated chamber filled with mercury. The tube is advantageously bent over into a "U-shape" so as to afford an economical utilization of space. In addition, a part of the fluid tubing may be advantageously constructed of a rigid material, e. g., a metal, so as to function as a support for the flexible rubber tube within the chamber. Thus, by winding the rubber hose around the metal tubing, the flexible conduit is supported and its effective length increased. The chamber may be filled with mercury by means of a suitable side port while the pressure of the non-compressible medium is accurately regulated by the movement of a screw element in the chamber, situated at the end of the chamber opposite to the entering and exit orifices for the fluid conduit. My method and apparatus is capable of more precisely regulating very low flow rates of fluids than heretofore attainable by conventional procedures and devices and will serve, for instance, as a highly satisfactory bleed control for a high vacuum system.

Figure 1 illustrates a micro control valve embodying my invention.

The valve indicated by Figure 1 comprises essentially an elongated narrow chamber 11 containing the compressible fluid conduit 13, for example, a neoprene rubber tube, and filled with a non-compressible liquid, e. g., mercury. As hereinbefore described, the conduit is "U-shaped" and is constructed partially of a rigid material, a metal, for instance, so as to afford a support for the neoprene tube 13 which may be wound spirally around the rigid tube 12 so as to attain a maximum pressure drop in a minimum amount of space. At about the middle of the chamber there is located a valve-controlled orifice 14 to permit entrance of the mercury liquid. This mercury-filling valve 14, regulated by hand wheel 15, is connected to the main chamber by means of a threaded joint 16 affixed to a short pipe section 17 which, in turn, is welded to the main chamber. The pressure of the mercury is controlled by a screw element 21, situated at the end opposite to the fluid entrance 25 and exit 26, and which is advantageously part of valve 18. The mercury pressure control pressure adjusting device 18, regulated by hand wheel 19, is attached to the chamber by a fluid-tight threaded joint 20. The fluid conduits are connected to and pass through a fluid-tight socket 24, preferably threaded and screwed into the lower end of the chamber at 23 so as to facilitate a simple removal. The neoprene rubber hose and rigid tubing are easily connected at 22, since the internal diameter of the flexible hose is less than the external diameter of the metal tubing.

The valve is operated as follows: The main chamber 11 is most advantageously evacuated of air through valve 14. Liquid mercury is then admitted to the chamber through the latter valve so as to fill the chamber and the fluid to be controlled is admitted through line 25, passing through the rubber and metal conduits within the mercury-filled chamber and leaving by means of line 26. Valve 14 is then closed by means of hand wheel 15. The screw element 21 of pressure adjusting device 18 may be then moved up or down within the chamber so as to effect a desired control of the volume of the mercury in the chamber and, hence, of the pressure upon the neoprene rubber conduit 13. Considerable movement of the hand wheel is required in order to effect a small change in the pressure and therefore a precise regulation of the micro flow rate is made possible.

The compressible conduit in the valve I have described may be made of any rubber-like material that is resistant to the non-compressible medium and the fluid that flows through it. Generally, neoprene rubber has been found to be highly satisfactory. The liquid medium may be any non-compressible liquid. However, a liquid like mercury has a low tendency to leak through any openings because of its high surface tension. Thus liquids of low surface tension will pass through openings where liquids of high surface tension might not; accordingly, non-compressible liquids of the latter type are preferred. The chamber and the rigid conduit enclosed by it may be constructed of any material that is resistant to the non-compressible medium and that will contain it satisfactorily at the desired operating pressures; many metals are satisfactory, e. g., stainless steel. However, the operation and construction of the valve, as well as the procedure for regulating these very low flow rates, is dependent in great part upon the particular gas or liquid to be controlled.

I particularly recommend for the valve, as illustrated in Figure 1, fluid conduits made of $\frac{1}{8}$-inch by $\frac{1}{16}$-inch stainless steel tubing and $\frac{1}{16}$-inch by $\frac{3}{32}$-inch neoprene rubber hose. In addition, $\frac{1}{2}$-inch stainless steel pipe sections have proved highly satisfactory for the chamber and connector for the mercury-filling valve. A valve so constructed may be operated advantageously when the pressure drop across it is not more than 200 p. s. i However, I have actually used such a valve where high pressures, e. g., 1500 p. s. i., are applied to the valve on the inlet side and a pressure drop of this magnitude taken across it. But the valve is not recommended for use as a shut-off control, since by compressing the mercury excessively, the neoprene rubber tube may be extruded into the metal tubing to which it is joined and thus damaged severely.

I claim:

A control valve for regulating flow rates of fluids under micro conditions which comprises an elongated compressible conduit of small cross-sectional area enclosed within a chamber filled with liquid mercury, said conduit extending for the length of the chamber in a U-shape, a valve located on the side of the chamber for filling the chamber with liquid mercury, and a pressure adjusting screw element which screws down into said liquid-filled chamber.

JOHN J. PIROS.

References Cited in the file of this patent

UNITED STATES PATENTS

| Number | Name | Date |
|---|---|---|
| 1,735,964 | Eule | Nov. 19, 1929 |
| 2,241,086 | Gould | May 6, 1941 |
| 2,487,226 | Eastman | Nov. 8, 1949 |
| 2,523,964 | Morris et al. | Sept. 26, 1950 |

FOREIGN PATENTS

| Number | Country | Date |
|---|---|---|
| 588,064 | Great Britain | May 13, 1947 |